Sept. 7, 1954  H. J. DI GIOVANNI ET AL  2,688,703
RADIOACTIVE LOGGING APPARATUS
Filed May 26, 1952  3 Sheets-Sheet 1

INVENTORS
HUGO J. DIGIOVANNI
ROBERT T. GRAVESON
BY ALFRED H. YOLI

Roland A. Anderson
ATTORNEY

INVENTORS
HUGO J DIGIOVANNI
ROBERT T. GRAVESON
BY ALFRED H. YOLI

*Roland A. Anderson*

ATTORNEY

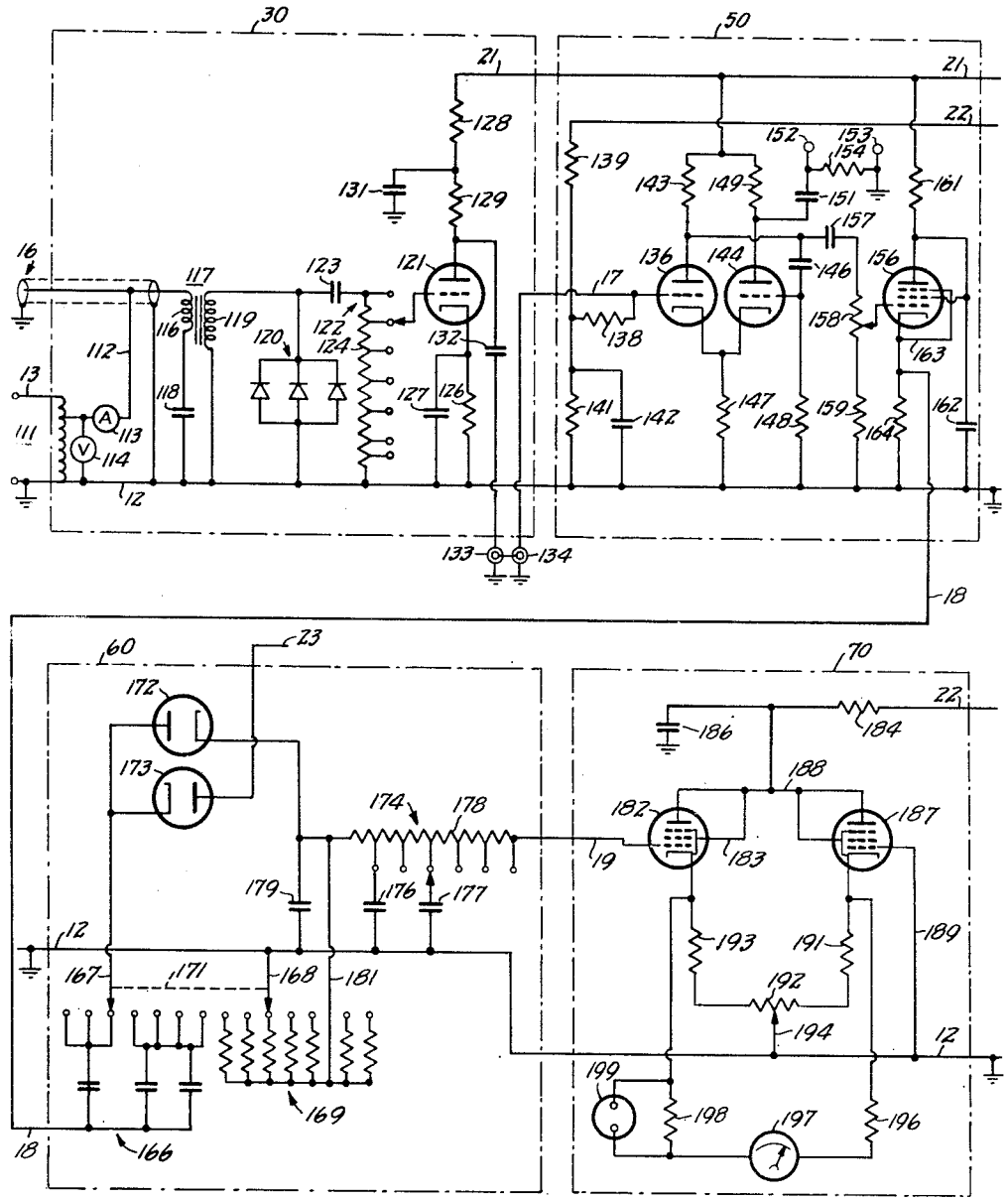

Patented Sept. 7, 1954

2,688,703

UNITED STATES PATENT OFFICE 2,688,703

RADIOACTIVE LOGGING APPARATUS

Hugo J. Di Giovanni, New York, Robert T. Graveson, Yonkers, and Alfred H. Yoli, New York, N. Y., assignors, by mesne assignments, to the United States of America as represented by the United States Atomic Energy Commission Application May 26, 1952, Serial No. 290,048

6 Claims. (Cl. 250—71)

The present invention relates to apparatus for detecting and measuring the radioactivity of deposits in the earth. Originally, in prospecting for radioactive material in various areas, it was the usual practice to drill a hole down through the deposit and bring out the drilled core of the material which was chemically analyzed for radioactive material such as uranium. More recently, instruments have been developed which may be inserted into the drilled hole on the end of a long cable. The conventional instrument includes a radiation counter tube in one end thereof which responds to any radioactivity present in the deposit and emits pulses that are transmitted through the cable to recording apparatus above the surface of the earth. By noting the variation of the rate of occurrence of the emitted pulses with the depth of the insertion in the drilled hole, it is possible to locate the radioactive deposits in the hole.

One of the problems involved in using such conventional instruments is the length of the radiation counter tube. The diameter of this tube is limited by the diameter of the drilled hole. Therefore, to increase the sensitive counting volume of the tube, the length of the tube must be increased. If the length of the tube is small, its sensitive counting volume will necessarily be small so that the counting time must be lengthened to achieve the same statistical accuracy. If the tube is made long, it is difficult to determine the extent of the radioactive deposit, which in some cases is not more than one inch in thickness while in other cases it may extend many feet in depth. One solution is to use a number of different sized counter tubes mounted in subsurface or probe units, each unit containing a different length radiation counter tube. The longest probe, using a tube approximately one foot in length, is initially inserted into the drilled hole. If any radiation is detected, the approximate location is noted and the probe removed. A smaller sized probe is then inserted. By successively decreasing the size of the counter tubes, it is possible to locate the extent of the radioactive deposit along the drill hole with a reasonable degree of accuracy.

The apparatus of the present invention does not require this lengthy procedure, as it includes a scintillation counter which is very small in physical size but which responds to low as well as high levels of radioactivity. Another difficulty encountered with conventional instruments is the determination of the energy of the radiation emitted in the deposit. Since the conventional instruments use counter tubes operating in the Geiger region, the output pulse of the tube will always have the same amplitude regardless of the radiation energy. With the scintillation counter of the present instrument, the amplitude of the output pulses bears a direct relation to the energy of the impinging radiation. Another advantage of the present instrument is the improved structural features of its probe unit which simplifies operating procedures while simultaneously decreasing maintenance time.

More particularly, the present invention relates to radiation measuring apparatus, for use with drill hole boring apparatus, which includes a subsurface unit and a surface unit connected by a coaxial cable. The subsurface unit includes means responsive to the impinging radiation for developing voltage pulses proportional to the number and energy thereof, means for amplifying the voltage pulses and developing output pulses for transmission along the coaxial cable to the surface unit. The surface unit includes means for amplifying the output pulses, oscillating means responsive to the amplified output pulses for developing one rectangular pulse of predetermined height and width for every amplified output pulse, means for varying the height of the rectangular pulses, a ratemeter circuit responsive to the rectangular pulses for detecting the rate of arrival and amplitude thereof and power supply means for supplying operating voltages to the subsurface unit along the coaxial cable and simultaneously to the surface unit.

It is accordingly an object of the present invention to provide a new and improved radiation measuring apparatus for use with drill hole boring apparatus.

A second object of the invention is to provide a new and improved radiation measuring apparatus for use with drill hole boring apparatus which provides output pulses proportional to the energy of the incident radiation.

Still another object of the invention is to provide a new and improved radiation measuring apparatus using a scintillation crystal.

A further object of the invention is to provide a new and improved probe unit for use with drill hole radioactive logging apparatus.

The many objects and advantages of the present invention may best be appreciated by reference to the accompanying drawings, the figures of which illustrate apparatus incorporating a preferred embodiment of the present invention.

Fig. 3 is a schematic wiring diagram of the circuits used in the surface unit.

Figure 1:
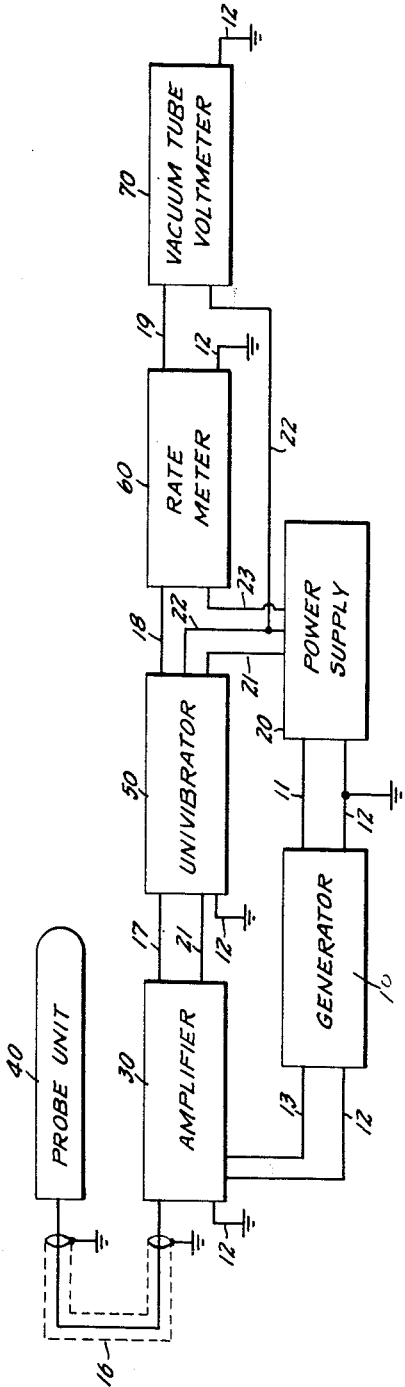
Fig. 1 is a block diagram of the various operating elements showing the interconnections between the circuits of the apparatus.

Referring now to Fig. 1, the relationship between the various circuits of the apparatus will be described: All the power used for the surface unit and the subsurface unit of the apparatus may be derived from a conventional generator 10. One of the outputs of generator 10 energizes the power supply 20 by means of conductor 11 and ground connection 12. The other output of generator 10 is connected to the amplifier 30 by means of connector 13 and ground connection 12. This output from generator 10 is transmitted from amplifier 30 to the probe unit 40 through a coaxial cable 16.

The probe unit 40 is the subsurface unit of the instrument and the pulses derived therefrom are transmitted to amplifier 30 of the surface unit by means of the coaxial cable 16. The amplified output pulses from amplifier 30 are transmitted to univibrator 50 through conductor 17 and ground connection 12. In turn, the univibrator output is applied to the input of the ratemeter 60 on conductor 18 and the ratemeter output is indicated by vacuum-tube voltmeter 70 through the conductor 19. Further operating voltages for the surface unit are supplied from the power supply 20 by means of conductors 21, 22 and 23. Power supply 20 is a conventional unit capable of providing both positive and negative vacuum tube operating potentials. The various components of the surface unit including the generator 10 may conveniently be mounted on mobile automotive equipment which could also carry a reel for the coaxial cable 16.

Figure 2:
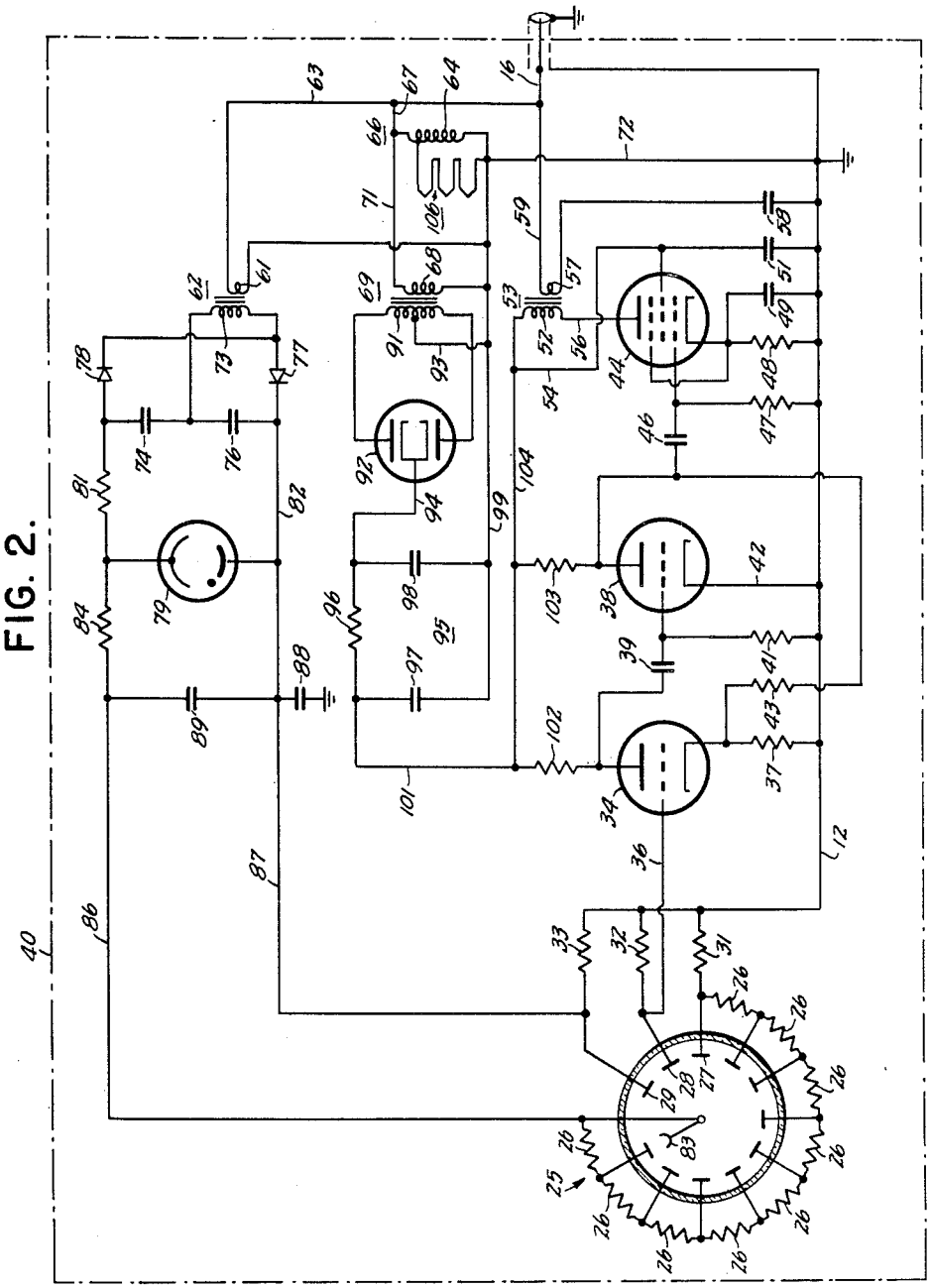
Fig. 2 is a schematic wiring diagram of the subsurface probe unit.

Referring now to Fig. 2, the operation of the subsurface probe unit will be described. A scintillation crystal (not shown) is mounted on the photosensitive face of the photomultiplier tube indicated generally by the arrow 25. Voltage dropping resistors 26 are connected between the plurality of dynodes of the photomultiplier tube. The last two dynodes 27 and 28 and the anode 29 are respectively connected to the ground connection 12 through resistors 31, 32 and 33. The last dynode 28 is also directly connected to the control electrode of tube 34 by means of conductor 36. The cathode of the tube 34 is connected to ground through resistor 37 and the plate is coupled to the control electrode of tube 38 through condenser 39. The control electrode of tube 38 is further connected to ground by means of resistor 41 and the cathode is directly connected to ground through conductor 42.

The plate of the tube 38 is connected to the cathode of the tube 34 through resistor 43 and is further coupled to the control electrode of tube 44 by means of condenser 46. The suppressor grid of the tube 44 is directly connected to the cathode. The control electrode and the cathode are respectively connected to ground through resistors 47 and 48. Across resistor 48 is connected a bypass condenser 49. The screen grid of tube 44 is connected to ground through condenser 51 and is further connected to one side of the secondary winding 52 of transformer 53 by means of conductor 54. The other side of the secondary winding 52 is connected on conductor 56 to the plate of the tube 44. The primary winding 57 of the transformer 53 has one side coupled to ground through condenser 58 and its other side directly connected to the center conductor of coaxial cable 16 by conductor 59.

Cable 16 is further connected to one side of primary winding 61 of high voltage transformer 62 by conductor 63, and one side of primary winding 64 of filament transformer 66 by conductor 67; and to one side of primary winding 68 of low voltage transformer 69 by means of conductor 71. The other sides of the primary windings are all connected together and to ground by means of conductor 72. One side of the secondary winding 73 of the transformer 62 is connected to the junction point between condensers 74 and 76. The other side of secondary winding 73 is connected to condenser 76 through rectifier 77 and to condenser 74 through rectifier 78. The junction point between condenser 74 and rectifier 78 is connected to the cathode of voltage regulator tube 79 through resistor 81 and the junction point of condenser 76 and rectifier 77 is connected to the anode of tube 79 by conductor 82. The cathode of tube 79 is further connected to the cathode 83 of photomultiplier tube 25 through resistor 84 and conductor 86. The anode of tube 79 is connected to the plate 29 of photomultiplier tube 25 by means of conductor 87 and is further connected to ground through condenser 88. Also connected from the anode of tube 79 to the cathode 83 of tube 25 is a condenser 89.

One side of the secondary winding 91 of low voltage transformer 69 is directly connected to one plate of a double diode tube 92 and the other side of secondary winding 91 is connected to the other plate of tube 92. The center tap of secondary winding 91 is connected to ground by conductor 93. The cathodes of tube 92 are connected together and are further connected by means of conductor 94 to an R-C filter 95 comprising resistors 96 and condensers 97 and 98. The other side of condensers 97 and 98 are connected together and to ground by conductor 99. The output of the filter 95 is connected on conductor 101 to the plate of tube 34 through resistor 102, as well as to the plate of tube 38 through resistor 103, and also to the screen grid and plate of tube 44 through conductors 104 and 54 and secondary winding 52 respectively. The secondary winding of filament transformer 66 is connected across the filaments 106 of the various tubes to provide proper heater potential.

In operation, low frequency alternating current voltage from generator 10 is applied to the coaxial cable 16 and from there to the primary windings of transformers 62, 66 and 69. Although the alternating current voltage is applied on conductor 59 to the primary winding 57 of transformer 53, essentially no voltage is induced in the secondary of this transformer because the condenser 58 in series with the primary winding acts as a virtual open circuit at low frequencies. Therefore, substantially all of the applied alternating current voltage is effective in inducing voltages in the secondary windings of transformers 62, 66 and 69.

The secondary voltage induced across the filaments 106 of the filament transformer 66 establishes the proper heater potentials for the various tubes in the probe unit. The voltage induced in the secondary winding 91 of transformer 69 is rectified by the full wave rectifier action of tube 92, smoothed out by the R-C filter network 95 and applied to the plates of tubes 34, 38 and 44 and the screen grid of tube 44. The voltage induced in the secondary winding 73 of the transformer 62 is rectified and doubled by the voltage doubler circuit represented by condensers 74 and 76 and rectifiers 77 and 78. The output of this voltage doubler circuit is regulated by the tube 79 and applied to the photomultiplier tube 25 between the cathode 83 and the plate 29.

The probe unit is now in condition for operation. Any radiation impinging on the scintillation crystal will cause the crystal to emit a proportional number of light photons. These photons appearing at the photosensitive cathode 83 will give rise to secondary electrons which are successively amplified and applied from the last dynode 28 to the control electrode of tube 34 on conductor 36. This pulse is positive and is amplified by preamplifier tube 34 giving rise to negative amplified pulse output from the plate thereof. The amplified pulse is applied to the control electrode of tube 38 through condenser 39 for further amplification.

The output is taken from the plate of tube 38 and is fed back through resistor 43 to the cathode of the tube 34 to provide degenerative feedback. This increases the stability and the bandwidth of the preamplifier. The output from the plate of the tube 38 is further applied to the control electrode of tube 44 through condenser 46. Tube 44 provides power amplification for the applied pulse and the output from this tube is coupled to the coaxial cable 16 through the pulse transformer 53. Since this output pulse represents only very high frequencies, the condenser 58 in series with the primary winding 57 is substantially a short circuit. On the other hand, the primary windings of the transformers 62, 66 and 69, to which the output pulse is also applied, represent an effective open circuit thereto.

The transformer coupling between the power amplification stage and the surface unit (transformer 53) also provides means for closely matching the impedance of the coaxial cable. This provides a maximum power transfer between these units and results in highly efficient subsurface probe.

Therefore, the function of the probe unit is to emit amplified output pulses on coaxial cable 16 whose amplitude is proportional to the energy of the radiation impinging on the scintillation crystal in the manner hereinabove described. The rate of occurrence of the output pulses is directly proportional to the rate of radiation impingement.

Referring now to Fig. 3, the operation of the surface unit will be set forth. The coaxial cable 16 is connected to the variable transformer 111 on conductor 112, through an ammeter 113. A voltmeter 114 is connected between the conductor 112 and the ground connection 12. The coaxial cable is also connected to one side of the primary winding 116 of transformer 117. The other side of the primary winding is connected to ground through condenser 118. Connected across the secondary winding 119 of transformer 117 are three parallel rectifiers 120. One side of the secondary winding 119 is connected to ground and the other side is connected to the control electrode of tube 121 through a network 122 comprising condenser 123 and tapped resistor bank 124. The cathode of the tube 121 is connected to ground through cathode resistor 126 and bypass condenser 127. The plate is connected to the positive voltage conductor 21 through resistors 128 and 129. The junction point of these resistors is connected to ground through condenser 131. The plate of the tube 121 is further connected through condenser 132 to an external coaxial terminal 133. This terminal is provided so that an external stage of conventional amplification may be used if desired.

Normally, terminal 133 is directly connected to terminal 134 which in turn is connected to the control electrode of tube 136 by means of conductor 17. The control electrode is further connected through resistor 138 to the junction point of voltage divider resistors 139 and 141. Resistors 139 and 141 are connected in series between the positive voltage supply 22 and ground. Across resistor 141 is connected a bypass condenser 142. The plate of tube 136 is connected to positive supply 21 through resistor 143 and is further connected to the control electrode of tube 144 through a coupling condenser 146.

The cathodes of tube 136 and 144 are connected together and are further connected to ground through resistor 147. The control electrode of tube 144 is connected to ground through resistor 148 and the plate is connected to positive supply voltage 21 through plate resistor 149. The plate of the tube 144 is also connected through a coupling condenser 151 to a terminal 152. Terminal 152 is connected to a second terminal 153 and to ground by means of resistor 154. Terminals 152 and 153 are provided for attachment to an oscilloscope if desired to view the pulses at this point.

The plate of the tube 136 is further connected to the control electrode of the tube 156 through the coupling network comprising condenser 157, potentiometer 158 and resistor 159. The plate of the tube 156 is connected to the positive voltage supply 21 by means of anode resistor 161, as well as to ground through condenser 162 and is directly connected also to the screen grid. The suppressor grid of the tube 156 is connected to the cathode by conductor 163 and the cathode in turn is connected to ground through resistor 164. The output of tube 156 is taken from the cathode by means of conductor 18 and applied to one side of a tapped condenser bank 166.

The variable tap 167 of condenser bank 166 is mechanically coupled to variable tap 168 of resistor bank 169. This is indicated by the dotted line 171. The tap 167 is connected to the plate of diode 172 and the cathode of diode 173. The plate of diode 173 is directly connected to negative voltage supply conductor 23. The cathode of the tube 172 is connected to a variable network indicated generally by the numeral 174 and comprising condensers 176 and 177 and tapped series resistors 178. The cathode of the tube 172 is also connected to ground through condenser 179 and to resistor bank 169 by means of conductor 181.

The output of the network 174 is applied to the control electrode of tube 182 through conductor 19. The plate of the tube 182 is directly connected to its screen grid through conductor 183 and is further connected to the positive voltage supply conductor 22 through resistor 184. Bypass condenser 186 is connected from the plate to ground. The plate of the tube 182 is also directly connected to the plate and screen grid of tube 187 by conductor 188.

The control electrode of tube 187 is connected to ground on conductor 189 and the cathode is connected to the cathode of tube 182 through resistor 191, potentiometer 192 and resistor 193. The tap 194 of the potentiometer 192 is connected to ground. The cathodes of these tubes are further connected through resistor 196, ammeter 197, and resistor 198. A connector jack 199 is connected across resistor 198 for purposes to be described hereinbelow.

In operation, the output pulses appearing on coaxial cable 16 are applied to the amplifier 30 through transformer 117. In series with the primary winding 116 of transformer 117 is condenser 118 which acts as an effective short circuit with respect to the high frequency components of the input pulses. On the other hand, the winding of variable transformer 111 is effectively an open circuit with respect to these pulses due to the impedance of its winding.

Therefore, substantially all of the input pulses are effective in inducing voltages in the secondary winding 119 of transformer 117. These pulses are applied through network 122 to the control electrode of the amplifier tube 121. The amplified output pulses of tube 121 appear at its plate and are applied to coaxial terminal 133 through condenser 132. From this terminal they may be applied to a conventional amplifier if desired and the output of that amplifier impressed on coaxial terminal 134 or else these amplified output pulses may be directly applied to terminal 134 as illustrated.

Therefore, emerging from the amplifier 30 on conductor 17 are sharp amplified pulses whose amplitude is proportional to the energy of the radiation appearing in the drill hole and whose rate of occurrence is proportional to the impingement rate of the radiation. These pulses are applied on conductor 17 to the control electrode of the first tube 136 of the cathode-coupled univibrator comprising tubes 136 and 144. As is well known in the art, a cathode-coupled univibrator circuit is an oscillator circuit which emits a rectangular pulse of predetermined amplitude and width at a repetition rate controlled by the rate of occurrence of the applied input pulses.

In operation, tube 136 is normally in the conductive state due to the potential on its control electrode determined by the voltage divider network consisting of resistors 139, 141 and 138. When tube 136 is conducting, the potential drop across the cathode resistor 147 of the univibrator circuit is sufficiently high to prevent tube 144 from conducting. When the negative pulse appearing on conductor 17 is applied to the control electrode of the tube 136, it will decrease conduction in this tube and the amplified positive pulse appearing at its plate will charge condenser 146. This will increase the potential at the control electrode of the tube 144 causing it to conduct and substantially increase the voltage drop across cathode resistor 147. The result is to cut off tube 136 and provide a positive rectangular pulse of predetermined height and width in accordance with the time constants of the circuit. This positive rectangular pulse is applied through coupling condenser 157 to the control electrode of the cathode follower tube 156 and the output from this tube is taken from its cathode on conductor 18.

When the condenser 146 at the control electrode of tube 144 has sufficiently discharged, the tubes will return to their normal states with tube 136 conducting and tube 144 non-conducting. This places the univibrator circuit in condition to emit another positive rectangular pulse upon the arrival of a negative input pulse on conductor 17. Therefore, the output from the univibrator circuit 50 appears on conductor 18 and consists of positive rectangular pulses of predetermined height and width with a repetition rate determined by the rate of occurrence of the applied pulses appearing on conductor 17.

The rectangular pulses appearing on conductor 18 are applied to the tapped condenser bank 166 of the ratemeter circuit 60. The position of the tap 167 determines the size of the condenser chosen from condenser bank 166 and serves to change the amplitude of the pulses applied to the plate of the diode 172. That is, the amplitude of these pulses is determined by the charging rate of the condenser in bank 166 coupled with the internal impedance of the cathode follower tube 156. These pulses are applied to the plate of the diode 172 to cause this tube to conduct and charge the R-C network comprising the condenser 179 and tapped resistor bank 169.

The rate at which charged condenser 179 will discharge through the resistor chosen from bank 169 will depend on the relative magnitudes of these components. It can be seen that if these magnitudes are chosen so that condenser 179 is not fully discharged before the arrival of the next rectangular pulse on tube 118, the condenser will maintain a steady charge dependent upon the rate of arrival of the rectangular positive pulses.

Since the rate of arrival of these pulses is proportional to the rate of occurrence of the detected radiation in the scintillation crystal as described hereinbefore, the voltage appearing across condenser 179 will be proportional to this rate of occurrence. This voltage is applied through the tapped resistor bank 174 to the output conductor 19. Therefore, a voltage appears on output conductor 19 with an amplitude proportional to the rate of occurrence of the detected radiation.

The pulses appearing on conductor 19 are applied to the control electrode of the tube 182 which is the first tube of a conventional bridge-type vacuum-tube voltmeter circuit 70. The application of the voltage to the control electrode of the tube 182 unbalances the bridge circuit and causes an unbalance current to flow through the ammeter 197. Therefore, the indication on the ammeter 197 is directly related to the rate of occurrence of the detected radiation.

If it is desired to use a conventional recording voltmeter instrument, such as the Electronik Recorder manufactured by the Minneapolis-Honeywell Regulator Co., Brown Instruments Division, Philadelphia, Pa., the instrument can be connected to the connector jack 199 to measure the voltage across the resistor 198 due to the unbalance current.

The operation of the complete instrument will now be described. The subsurface probe unit 40 is attached to the surface unit of the apparatus by means of a long coaxial cable. This instrument is capable of operating with lengths of cable in the order of 1000 feet. The entire cable normally is kept on a reel, not shown, which can be conveniently mounted on a motor vehicle, not shown, with the rest of the surface unit. When it is desired to measure an earthen deposit for radioactivity, a hole is drilled at the desired locality with conventional drill hole boring apparatus. The subsurface probe unit 40 is then dropped down the length of the hole. The amount of cable that has been played out from the reel can be determined by using a conventional odometer at the output of the reel. The output of generator 10 mounted on the motor vehicle is connected across the variable transformer 111 of Fig. 3. The desired input current and voltage to the probe unit 40 is established by varying transformer 111 and reading ammeter 113 and voltmeter 114.

As described hereinabove, this generated voltage is a comparatively low frequency voltage in the order of 400 cycles, so that condenser 118 in series with primary 116 of transformer 117 is an effective open circuit to this voltage. Therefore, none of this alternating current voltage induces a voltage in the secondary winding 119 to disrupt the operation of the following circuits. The alternating current voltage is applied on coaxial cable 16 to the subsurface unit 40 and supplies power to this unit through transformers 62, 66 and 69 to set the unit in condition for operation. The high voltage applied across the photomultiplier tube is on the order of 1000 volts.

The reel on the motor vehicle is now turned to bring up the probe unit through the drilled hole at a predetermined rate. As the probe unit passes through the various deposits, the amount and energy of any radiation emitted therefrom will be registered in the following manner: The radiation impinging on the scintillation crystal will result in positive output pulses from the last dynode 28 of the photomultiplier tube 25. These pulses are applied to the control electrode of the tube 34.

Tubes 34 and 38 serve to amplify the pulses and apply them to the power amplifier tube 44. These output pulses are transformer-coupled from the winding 52 of output pulse transformer 53 to the coaxial cable 16. The output pulses appearing on coaxial cable 16 are applied through transformer 117 and network 122 to the control electrode of the tube 121 where they are further amplified and applied through terminals 133 and 134 to the control electrode of the first univibrator tube 136.

The operation of the univibrator circuit comprising tubes 136 and 144 results in a rectangular positive pulse of predetermined height and width appearing at the plate of the tube 136 and applied to the control electrode of the cathode follower tube 156. These rectangular pulses are taken from the cathode of tube 156 and applied on conductor 18 to the tapped condenser bank 166 where the amplitude of these pulses may be varied further.

The output of the tapped condenser bank 166 is applied to the ratemeter circuit tube 172 resulting in a voltage proportional to the repetition rate of the arriving rectangular pulses. This proportional voltage is applied to the vacuum-tube voltmeter 70 on conductor 19 and indicated on meter 197 or a recording voltmeter attached to connecting jack 199. If the paper on the recording voltmeter unit is wound at a rate proportional to the rate of rewinding the unwound cable, a permanent record is obtained as to the radioactivity of the deposit at any position in the drilled hole.

The scale of this ratemeter can be varied independently of the predetermined height and width of the positive rectangular pulses. As demonstrated above, variation of the tap 167 will permit choice of different sized condensers from condenser bank 166 which in turn will vary the amplitude of the pulses applied to the diode 172. This provides a scale changing feature which does not require resetting the time constants of the univibrator circuit. This feature is particularly important when wide variations of particle energy levels are encountered in a drill hole.

The ammeter 197 may be used to give instantaneous indication of the radioactivity of the deposit through which the probe unit is passing. The permanent record of the recording voltmeter is available for further study of the determination of the extent and energy level of any radioactive material in the vicinity of the drilled hole.

Instead of adding additional stages of amplification between terminals 133 and 134 of amplifier 30, it is possible to connect a conventional pulse height analyzer to determine the energy level of the detected radiation. Also, the tapped resistor bank 124 of network 122 in amplifier 30 may be varied to exclude all pulses derived from radiation below a desired energy range. For example, if it is desired to detect only gamma rays above five hundred thousand electron volts in energy, resistor bank 124 is set so that pulses derived from radiation below this energy range will not have sufficient amplitude to initiate the univibrator action.

Therefore, the only rectangular pulses developed in the univibrator will be due to gamma rays above five hundred thousand electron volts. This discriminator action is particularly useful if uranium is being prospected and it is suspected that other radioactive deposits such as potassium are in the vicinity. The radiation emanating from the deposits other than uranium would then be too low to be recorded in the surface unit. Such energy discrimination is not possible with conventional Geiger tube probes.

Figure 4:
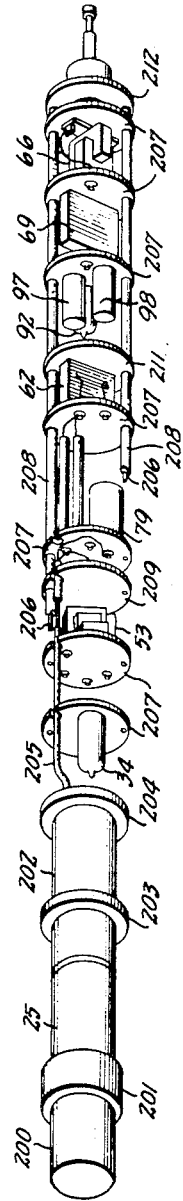
Fig. 4 is a perspective view of the probe unit with its housing removed to show the interior constructional details.

Referring now to Fig. 4, the physical assembly of the various circuits of the probe unit will be illustrated to indicate the improved structural features of the instrument and its design for ease in maintenance and replacement of component parts. The probe unit is shown in Fig. 4 with its cylindrical elongated housing removed to reveal the interior constructional details. At the left of the figure is shown the scintillation crystal 200 enclosed in an hermetically sealed mounting to avoid the deleterious effects of moisture and foreign matter.

The crystal 200 is shown mounted adjacent the photosensitive face of the photomultiplier tube 25 by means of an annular ring 201. The photomultiplier tube 25 is mounted in turn on an open-ended cylindrical base 202 with two annular mounting rings 203 and 204. The cylindrical base 202 is used to hold the voltage dropping resistors 26 required for use with tube 25. After the resistors have been placed within base 202, the base may be filled with a potting compound to permanently position the resistors and avoid effects of moisture.

Attached to the base 202 is a rigid assembly mounted on a plurality of rods 206. For purposes of clarity rods 206 are not shown extended to the base 202. Affixed in spaced relation to the rods 206 are seven electrically insulated wafers 207. Wafers 207 are maintained in the proper spaced relation by means of spacers 208. Shown mounted on the first wafer 207 nearest the open-ended base 202 is the preamplifier tube 34. Amplifier tubes 34 and 38 may be enclosed in one tube envelope of the conventional twin triode type and represented by the tube envelope 34.

The power amplifying tube 44 is also mounted on this wafer behind tube 34 but is not visible in this view. On the second electrically insulated wafer 207 is mounted the output pulse transformer 53. Next in line is a first electrically conductive plate 209 which is attached to the grounded rods 206 and serves to electrically shield the preamplifier and power amplifier unit from the following circuits. Mounted on the third and fourth wafers 207 is the high voltage power supply unit. Connected between the high voltage power supply unit and the cylindrical base is a shielded cable 205 going to the photomultiplier tube 25.

Shown in the figure is the high voltage rectifier tube 79 and transformer 62. A second electrically conductive plate 211 separates the high voltage supply unit from the remaining circuits. Mounted on the next two wafers is the low voltage power supply consisting of tube 92, condensers 97 and 98, and low voltage transformer 69. On the last wafer is mounted the filament transformer 66. Next to the filament transformer is mounted a coaxial connector 212 for attachment to the coaxial cable 16.

The use of the rigid assembly attached to the photomultiplier tube base results in an unusually compact, easily maintainable unit. If it is desired to replace any part of the unit, new wafers 207 can be wired up with the proper component parts and merely substituted for a defective component part. The electrically conductive shields 209 and 211 serve to completely isolate the various operating circuits of the probe unit and yet not unnecessarily lengthen the overall probe unit.

A satisfactory probe unit has been constructed in this manner, so that the assembled unit has an outer diameter of two inches and an overall length of approximately two and one-half feet. By use of this type of construction, the load on the cable is also considerably lessened, serving to prevent wear and tear on the cable. Other advantages will be apparent from the foregoing description.

If the use of rotating machinery is undesirable from the viewpoint of unwanted noise and interference, the generator 19 of the circuit may be replaced with a conventional 400-cycle electronic power supply which can be easily operated from the storage battery of the motor vehicle.

Although the unit has been described as being particularly adaptable for use with drill hole boring apparatus, it has been found useful in making preliminary aerial surveys of deposits. For example, to determine promising locations for starting the drill hole boring apparatus, the probe unit may be mounted on the wing of a plane and the surface unit mounted within the fuselage. Due to the efficient streamlined design of the probe unit, the apparatus is very suitable for this work. With the fast response time of the instrument, the speed of the plane is no handicap in determining the approximate location of radioactive areas. Surveys of this type may also be made while the probe unit is mounted on the motor vehicle.

This fast response time of the circuits of the apparatus is useful in the drill hole radioactive logging operation because the rate of ascendancy of the probe unit can be very fast and serves to lessen the time taken by this operation while still maintaining the high measuring accuracy of the instrument. For normal usage the probe unit of the instrument can be raised at a rate of thirty feet per minute which is five times as fast as conventional instruments. It is possible to obtain accurate logging even with faster ascendancy rates.

The instrument is particularly adapted for use in uranium prospecting. One crystal which has been found satisfactory for measuring the accompanying gamma radiation has been the thallium-activated sodium iodide crystal. However, it is apparent that the instrument can be used for measuring all types of nuclear radiations.

While the salient features of this invention have been described in detail with respect to one embodiment, it will of course be apparent that numerous modifications may be made within the spirit and scope of this invention and it is therefore not desired to limit the invention to the exact details shown, except insofar as they may be defined in the following claims.

We claim:

1. Nuclear radiation measuring apparatus, for use with drill hole boring apparatus, which comprises in combination a subsurface unit, a surface unit, a coaxial cable connecting said units, said subsurface unit including a scintillation crystal responsive to the radiation impinging thereon and emitting photons in proportion to the amount and energy of said radiation, means responsive to said photons for developing voltage pulses proportional to the number of said photons, means for amplifying said voltage pulses, power amplifying means for developing output pulses for transmission along said cable to said surface unit, said power amplifying means having a transformer-coupled output and a condenser in series with the primary of said output transformer, said surface unit including amplifying means for said output pulses, said amplifying means having a transformer-coupled input, a condenser in series with the primary of said input transformer, oscillating means responsive to said amplified output pulses and developing one rectangular pulse of predetermined amplitude and width for every amplified output pulse, means for varying the amplitude of said rectangular pulses, a rate-meter circuit responsive to said rectangular pulses for indicating the rate of arrival thereof, and power supply means for supplying operating voltages to said subsurface unit along said coaxial cable and simultaneously to said surface unit.

2. The apparatus of claim 1 wherein said scintillation crystal is thallium-activated sodium iodide and said means responsive to said photons is a photomultiplier tube.

3. Nuclear radiation measuring apparatus, for use with drill hole boring apparatus, which comprises in combination a subsurface unit, a surface unit, a coaxial cable connecting said units, said subsurface unit including means responsive to the radiation impinging thereon, means for developing voltage pulses proportional to the amount and energy of said radiation impinging upon said first means, means for amplifying said voltage pulses and developing output pulses for transmission along said cable to said surface unit, said surface unit including means for amplifying said output pulses, a univibrator responsive to said amplified output pulses and developing one rectangular pulse of predetermined amplitude and width for every amplified output pulse, a cathode follower connected to the output of said univibrator, a variable condenser having one of its ends connected to the cathode of said cathode follower and its other end connected to a ratemeter circuit, said ratemeter circuit including a double diode with a variable resistor-condenser network in the output thereof, a bridge-type vacuum-tube voltmeter for recording the rate of arrival of said rectangular pulses and power supply means for supplying operating voltages to said subsurface unit along said coaxial cable and simultaneously to said surface unit.

4. Nuclear radiation measuring apparatus, for use with drill hole boring apparatus, which comprises in combination a subsurface unit, a surface unit, a coaxial cable connecting said units, said subsurface unit including a scintillation crystal responsive to the radiation impinging thereon and emitting photons in proportion to the amount and energy of said radiation, means responsive to said photons for developing voltage pulses proportional to the number of said photons, means for amplifying said voltage pulses, power amplifying means for developing output pulses for transmission along said cable to said surface unit, said power amplifying means having a transformer-coupled output and a condenser in series with the primary of the output transformer, said surface unit including amplifying means for said output pulses, said amplifying means having a transformer-coupled input, a condenser in series with the primary of said input transformer, oscillating means responsive to said amplified output pulses and developing one rectangular pulse of predetermined amplitude and width for every amplified output pulse, a cathode follower connected to the output of said oscillating means, a variable condenser having one of its ends connected to the cathode of said cathode follower and its other end connected to a ratemeter circuit, said ratemeter circuit including a doubled iode with a variable resistor-condenser network in the output thereof, a bridge-type vacuum-tube voltmeter for recording the rate of arrival of said rectangular pulses, a generator for supplying an alternating current voltage to said subsurface unit, a low voltage supply in said subsurface unit responsive to said alternating current voltage for developing a low voltage tube operating potential, said low voltage supply having an input transformer coupled to said coaxial cable, a high voltage supply in said subsurface unit responsive to said alternating current voltage and developing a regulated high voltage for operation of said photon-responsive means, said high voltage supply having an input transformer coupled to said coaxial cable and power supply means for said surface unit.

5. For use in drill hole radioactive logging apparatus wherein a surface unit supplies power to and measures the output pulses from a subsurface probe unit, an improved probe unit comprising a rigid assembly suitable for disposition in an elongated housing, and including a photomultiplier tube mounted on an open-ended cylindrical base, a plurality of resistors connected to said multiplier tube and mounted within said cylindrical base, a scintillation crystal affixed adjacent the photosensitive face of said photomultiplier tube, a plurality of rods terminating at one end in said cylindrical base and at the other end in a coaxial jack, a plurality of electrically insulated parallel wafers affixed to said rods in spaced relation between said cylindrical base and said coaxial jack, a preamplifier tube and a power amplifier tube mounted on the first of said wafers nearest said cylindrical base, said preamplifier tube being connected to the output of said photomultiplier tube and said power amplifier tube being connected to the output of said preamplifier tube, a pulse transformer mounted on the second said wafer and connected between the output of said power amplifier tube and said coaxial jack, a first electrically conductive plate affixed to said rods and electrically isolating the circuits mounted on said first and second wafers from the remaining circuits, a high voltage power supply mounted between the third and fourth of said wafers, a high voltage transformer mounted on the fourth of said wafers, and connected between the input of said high voltage power supply and said coaxial jack, the output of said high voltage power supply being connected to said photomultiplier tube, a second electrically conductive plate affixed to said rods and electrically isolating the high voltage supply from the other circuits mounted in the probe unit, a low voltage supply mounted on the fifth and sixth of said wafers, the input of said low voltage supply being connected to said coaxial jack and the output being connected to said preamplifier and power amplifier tubes, a filament transformer mounted on the seventh of said wafers and a third electrically conductive plate affixed to said rods and mounted on said coaxial jack.

6. Nuclear radiation measuring apparatus for use with drill hole boring apparatus, which comprises in combination a subsurface unit, a surface unit, a coaxial cable connecting said units, said subsurface unit including a rigid assembly adapted for removable disposition in an elongated housing, said assembly including a scintillation crystal mounted on the photosensitive face of a photomultiplier tube, said scintillation crystal being responsive to the radiation impinging thereon and emitting photons in proportion to the amount and energy of said radiation, said photomultiplier tube being responsive to said photons and developing voltage pulses proportional to the number of said photons, a plurality of rods terminating at one end in a cylindrical base and at the other end in a coaxial jack, a plurality of electrically insulated parallel wafers affixed to said rods in spaced relation between said cylindrical base and said coaxial jack, means for amplifying said proportional voltage pulses and power amplifying means both mounted on the first of said wafers nearest said cylindrical base, said power amplifying means being responsive to the amplified voltage pulses and developing output pulses for transmission along said cable to said surface unit, said subsurface unit further including electrically conductive plates to isolate the various circuits thereof from one another, the circuits of said subsurface unit including a pulse transformer mounted on the second said wafer, a high voltage power supply mounted between the third and fourth of said wafers, a high voltage transformer mounted on the fourth of said wafers, a low voltage power supply mounted on the fifth and sixth of said wafers and a filament transformer mounted on the seventh of said wafers, and said surface unit including means for amplifying said output pulses, oscillating means responsive to said amplified output pulses and developing one rectangular pulse of predetermined amplitude and width for every amplified output pulse, means for varying the amplitude of said rectangular pulses, a ratemeter circuit responsive to said rectangular pulses for indicating the rate of arrival thereof and power supply means for supplying an alternating current voltage to said subsurface unit along said coaxial cable and simultaneously supplying operating voltages to said surface unit.

References Cited in the file of this patent

UNITED STATES PATENTS

| Number | Name | Date |
|---|---|---|
| 2,481,014 | Herzog | Sept. 9, 1949 |
| 2,534,932 | Sun | Dec. 19, 1950 |
| 2,550,106 | Coltman et al. | Apr. 24, 1951 |
| 2,648,012 | Scherbatskoy | Aug. 4, 1953 |